April 26, 1938.  J. E. VINCENT  2,115,512
PRESSURE REGULATOR
Filed Jan. 29, 1932  2 Sheets-Sheet 2

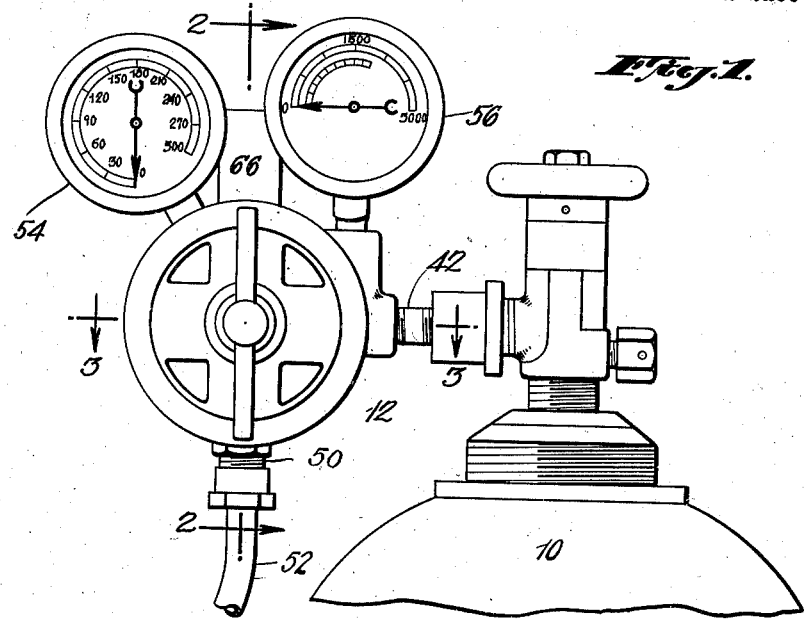
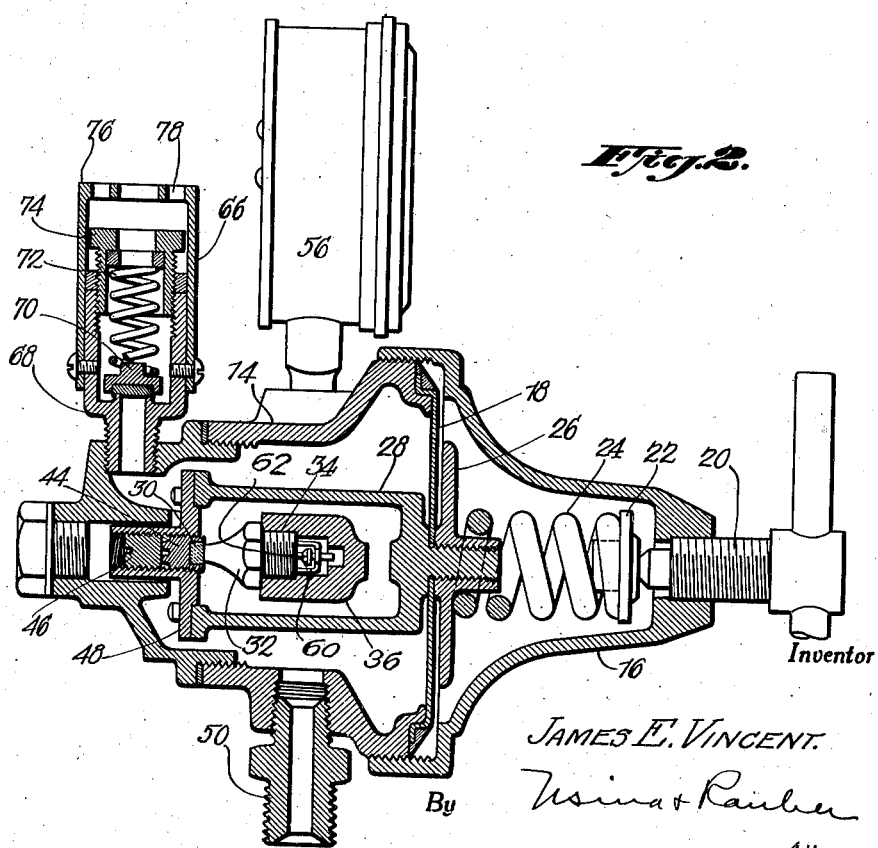

Inventor
JAMES E. VINCENT.

By
Attorneys

UNITED STATES PATENT OFFICE 2,115,512

PRESSURE REGULATOR

James E. Vincent, Johnstown, Pa.

Application January 29, 1932, Serial No. 589,720

7 Claims. (Cl. 277—20)

This invention relates relates to improvements in fluid pressure regulating valves and more particularly to means for increasing the safety of workmen engaged in operating appurtenances connected with said regulating valve. While not limited thereto, the regulator to which my invention is very frequently applied is one used in connection with fluid supply tanks forming part of oxygen, hydrogen or acetylene welding equipment. Fluid pressure regulating valves for such equipment frequently take the form of those illustrated, for example, in Bastian Patent 1,394,395 or Messer Patent 1,514,217. While I am not limited to the use of the specific structures shown in these prior patents, my improvements are well suited for use in combination with the character of valve shown therein.

The nature of my improvements will be fully apparent from the following specification when read in connection with the accompanying drawings and will be defined with particularity in accordance with statutory requirements in the appended claims.

In the drawings:—

Fig. 1 is a general view showing the character of apparatus to which my invention applies;

Fig. 2 is a vertical section on line 2—2 of Fig. 1;

Figure 3:
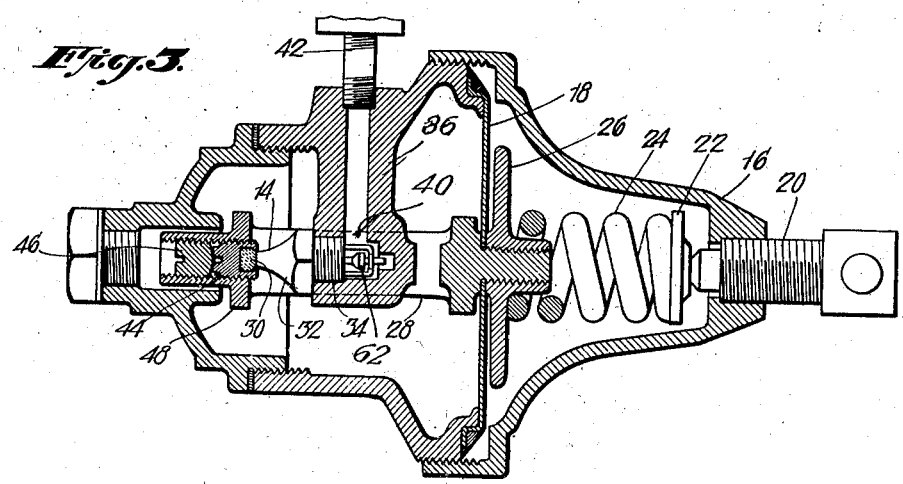
Fig. 3 is a section on line 3—3 of Fig. 2.

Referring in detail to the drawings; 10 represents a so-called bottle or tank, which usually contains a supply of oxygen which is maintained at high pressure, for example, from 1800 to 2000 pounds per square inch. The regulator, indicated as a whole at 12, communicates with the supply tank or bottle 10. This regulator includes a chambered casing 14 having a bonnet 16 screwed on the end thereof and clamping in place a diaphragm 18. An adjusting screw 20 is threaded through the end of the bonnet and it presses on a disc 22, which engages one end of a compression spring 24, the other end of which engages a larger disc 26, which is secured to a yoke 28. The diaphragm 18, as shown, is clamped between the disc 26 and the yoke 28.

The yoke 28 forms a movable support for a valve disc 30, which cooperates with the nozzle 32. This nozzle 32 has a screw threaded shank 34, which is secured to a bridge piece 36 forming part of the casing of the regulator. The nozzle has a duct 38 extending axially therethrough. This duct normally communicates with a passageway 40 formed in the bridge piece 36. This passage being connected by a pipe 42 with the oxygen supply tank 10. The bridge piece is straddled by the yoke 28, as shown.

The disc 30 is adjustably and removably mounted in a screw plug 44 and adapted to be locked in position by a threaded clamp stud 46. These members being seated in a hub formed on a plate 48 secured to the extremity of the yoke 28.

In the normal operation of the regulator, the communication between the fluid supply tank 10 and the outlet fitting 50 which connects with a suitable hose 52 leading to suitable welding nozzles, is controlled by the relative positions of the extremity of nozzle 32 and the valve disc 30. By adjusting the screw 20, the operator can regulate the effective tension of the spring 24, so as to control the pressure to suit requirements. The working pressure on a low pressure side is indicated by suitable pressure gauge 54 which communicates with the chamber defined by the interior of the casing 16 and diaphragm 18. There is a similar high pressure gauge 56 which communicates with the passage 40 leading from the supply pipe 42.

In the normal operation of regulators of the character thus far described, the valve disc 30 frequently becomes badly worn, cracked, or totally destroyed. This is very apt to cause a serious accident because of the high pressure of fluid handled by this type of regulator. It is common practice to renew the valve disc 30 and workmen handling the apparatus of this character are instructed to examine the disc at regular intervals and have it renewed. Various suggestions have been made heretofore to prolong the life of a disc. Nevertheless, in actual practice, the discs are frequently destroyed. This constitutes a serious hazard. My present invention aims to provide means for automatically cutting off the supply of high pressure gas in the event of the breakage or failure of the disc. To these ends, I provide means effective to positively interrupt the gas flow upon breakage of the disc. In the embodiment of the invention illustrated, I provide a stem 58, which extends axially through the duct 38 in the nozzle, one end of this stem normally resting or bearing against the valve disc 30. The opposite end of the stem is slidably guided in a guide fitting 60 secured to the nozzle. The stem carries a valve head 62 having a portion formed with a substantially spherical surface adapted to cooperate with a similarly shaped valve seat 64 formed in the nozzle 32.

Figure 4:
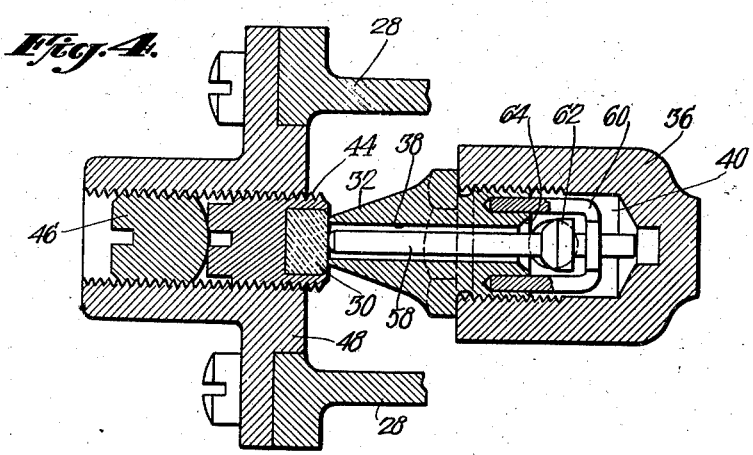
Fig. 4 is an enlarged view illustrating one position of my improved cut off valve.
Figure 5:
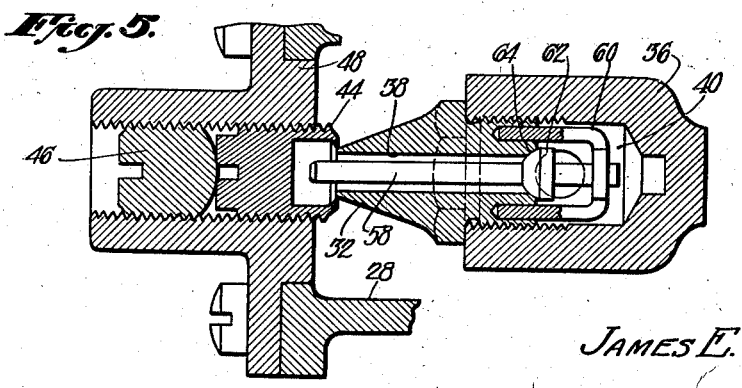
Fig. 5 is a similar view illustrating how my improved cut off valve prevents the flow of high pressure fluid in the event of breakage of the valve disc.

So long as the valve disc 30 is in good condition, the stem 58 will hold the valve head out of contact with the valve seat 62 and thus permit the flow of high pressure fluid from the reservoir 10 through the passage 40 and into the interior chamber of the regulator and thence by way of fitting 50 to the hose 52. The parts at this time being in the position illustrated in Fig. 4. Upon the breakage, burning, or destruction of the valve disc 30, fractured pieces thereof will be blown away. This will permit the stem to move relatively to the nozzle so as to bring the valve head 62 firmly into contact with the valve seat 64, thus positively preventing the flow of high pressure fluid from the tank. This position of the parts is illustrated in Fig. 5. Once the valve moves to the position of Fig. 5, it will be understood that the pressure on the enlarged head thereof will hold it in closed position. Upon reassembly of the parts the valve disc 30 will of course restore the parts to the working position of Fig. 4. In this position, the nozzle 32 is shown in closed engagement with the valve disc 30. It is understood of course that the nozzle 32 can be unseated from the disc 30 by manipulation of the adjusting screw 20, when the operator wishes to permit the flow of fluid from the supply tank to the hose 52.

The regulator is also equipped with a relief valve, indicated as a whole at 66, which is adapted to vent the fluid to atmosphere in the event that a dangerous or abnormal pressure should tend to build up within the chamber 14. This relief valve includes a body 68 having a shank in threaded engagement with the regulator casing, this body carrying a valve member 70 normally held in engagement with its valve seat by a spring 72, whose tension can be varied by adjusting a threaded spring cup 74. The spring cup 74 is enclosed by a cover 76 having suitable vent holes 78 formed therein.

The combined action of the cut off valve 62 and the relief valve 66 is of considerable importance at the time of, or immediately following the instant of failure of the valve disc 30. The relief valve at such critical period is effective to vent to atmosphere the fluid which passes the valve head 62 in the momentary interval which elapses while it travels from its open position of Fig. 4 to its cut off position of Fig. 5. The relief valve is also effective to prevent the building up of a dangerous bursting pressure in the casing 14 or the hose 52, such as might be occasioned by leakage between the nozzle 32 and valve disc 30 just prior to the ultimate complete failure or destruction of the disc.

Various modifications may be made by those skilled in the art without departing from the invention as defined in the following claims.

What I claim is:—

1. A pressure regulator comprising a nozzle having a duct extending therethrough for the passage of high pressure fluid, a disc coacting with said nozzle, the disc and nozzle being movable relatively to one another and jointly controlling the flow of fluid through said duct, and a supplementary valve having an imperforate head effective to positively close said duct only upon the destruction and consequent removal of said disc.

2. A pressure regulator comprising a nozzle having a duct extending therethrough for the passage of high pressure fluid, a disc coacting with said nozzle, the disc and nozzle being movable relatively to one another and jointly controlling the flow of fluid through said duct, and a supplementary valve formed with an imperforate head and having parts coacting with the nozzle and the disc and effective to automatically close the duct in said nozzle only upon the shattering and blowing away of the shattered parts of said disc.

3. A pressure regulator comprising a nozzle having a duct extending therethrough for the passage of high pressure fluid, a disc coacting with said nozzle, the disc and nozzle being movable relatively to one another and jointly controlling the flow of fluid through said duct, a supplementary valve having an imperforate head adapted at times to close the duct in said nozzle, and means normally engaging said disc and effective to hold said head in position to permit the flow of fluid through said duct and adapted to permit the movement of said head to a position to stop said flow only upon the breakage and consequent removal of said disc.

4. A pressure regulator comprising a nozzle having a duct extending therethrough for the passage of high pressure fluid, a disc coacting with said nozzle, the disc and nozzle being movable relatively to one another and jointly controlling the flow of fluid through said duct, a stem extending through and projecting beyond the ends of said nozzle, said stem having an imperforate head coacting with a seat formed in the nozzle and having a part normally resting on the disc and holding the head out of contact with said seat.

5. A pressure regulator of the character described including a nozzle secured to a fixed support, said support having a passage therein which communicates with a source of high pressure fluid, a member movable toward and from said nozzle and having a disc which is normally effective to control the flow of fluid through the nozzle, said disc being secured in a member which is adjustable longitudinally of said nozzle, a stem extending through the nozzle and having one extremity normally resting on said disc and an imperforate valve head intermediate the ends of the stem coacting with the nozzle and arranged to normally permit the flow of fluid therethrough and guiding means for said stem.

6. A pressure regulator of the character described including a nozzle having a duct formed therein, a fixed support for the nozzle having a fluid supply passage therein communicating with said duct, a member movable toward and from the nozzle carrying a valve disc, a stem extending through the duct having one end normally engaging said valve disc and the other end slidingly engaging a guide carried by the nozzle, said nozzle having an inner valve seat having a substantially spherical surface and a valve head carried by the stem and having a substantially spherical portion for coaction with said seat.

7. In combination, a valve disc and a coacting valve member having a duct therein communicating with a source of high pressure fluid, said disc and member being movable relatively to one another and an imperforate valve between said pressure source and said duct normally held unseated by said disc and adapted to be seated automatically only upon destruction and removal of said disc.

JAMES E. VINCENT.